US012623153B2

(12) United States Patent
Syed

(10) Patent No.:     US 12,623,153 B2
(45) Date of Patent:       May 12, 2026

(54) VIDEOGAME CHARACTER REGION VIEWER

(71) Applicant: Electronic Arts Inc., Redwood City, CA (US)

(72) Inventor: Daanish Syed, Arlington Heights, IL (US)

(73) Assignee: Electronic Arts Inc., Redwood City, CA (US)

( * ) Notice: Subject to any disclaimer, the term of this patent is extended or adjusted under 35 U.S.C. 154(b) by 150 days.

(21) Appl. No.: 18/612,408

(22) Filed: Mar. 21, 2024

(65) Prior Publication Data

US 2025/0295997 A1     Sep. 25, 2025

(51) Int. Cl.
*A63F 13/63*          (2014.01)
(52) U.S. Cl.
CPC ................................... *A63F 13/63* (2014.09)
(58) Field of Classification Search
CPC ..................................................... A63F 13/63
See application file for complete search history.

(56)           References Cited

U.S. PATENT DOCUMENTS

2020/0306640 A1 * 10/2020 Kolen ..................... G06N 3/094
2021/0118239 A1 * 4/2021 Santesteban ............. G06N 3/08
2022/0292791 A1 * 9/2022 Makeev .................. G06T 19/20
2025/0148737 A1 * 5/2025 Henry ..................... G06T 19/00

* cited by examiner

*Primary Examiner* — Pegeman Karimi
(74) *Attorney, Agent, or Firm* — KNOBBE, MARTENS, OLSON & BEAR, LLP

(57)           ABSTRACT

The present disclosure provides a system for customizing virtual entities via a multi-track system. The system can generate a user interface that uses multiple tracks to manage and display virtual entities and virtual objects. The virtual entity can be in-line with a track, and virtual display objects can move along tracks that intersect with the virtual entity track. When a particular virtual display object intersects with the virtual entity track, a three-dimensional representation of an item associated with the particular virtual display object can be rendered with the virtual entity.

20 Claims, 10 Drawing Sheets

100

102

Computing System

104

Computing
Resources

106

Application
Data Store

108

Game Application

110

Game Data

112

Game State
Information

114

Game Engine

116

Simulation
Engine

118

Rendering
Engine

T=0

T=1

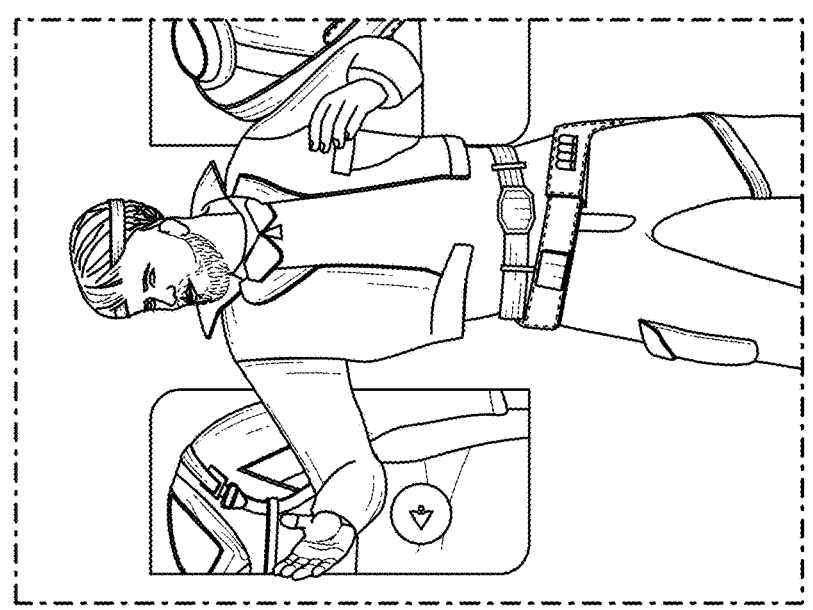
T=2
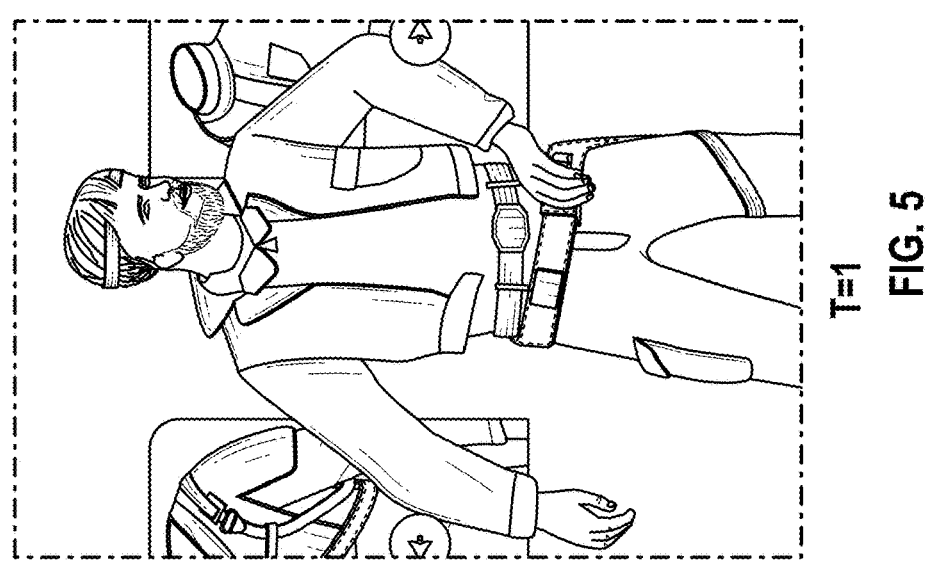
T=1
FIG. 5
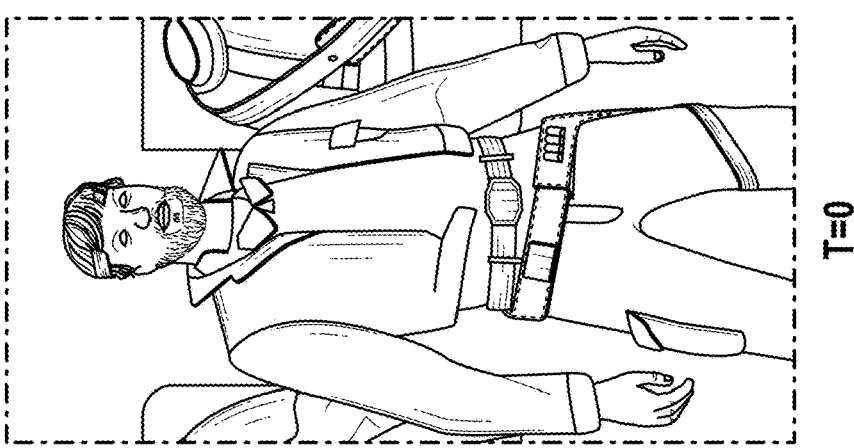
T=0

700

710
Output customization interface

720
Receive interaction on customization interface

730
Move virtual display objects along customization track

740
Determine virtual entity display characteristics

750
Output updated virtual entity and virtual display objects

760
Trigger reaction animation

VIDEOGAME CHARACTER REGION VIEWER

BACKGROUND

Video games are becoming increasingly more complex and realistic. To create a more immersive experience for players, games provide the option to customize characters and other objects within a game. With increased image quality and mechanics, there is a desire for new customization experiences.

SUMMARY OF EMBODIMENTS

The systems, methods, and devices of this disclosure each have several innovative aspects, no single one of which is solely responsible for all of the desirable attributes disclosed herein.

In some aspects, the techniques described herein relate to a computer-implemented method, including: causing a customization interface to display within a virtual environment of a game application, the customization interface including: a three-dimensional (3D) virtual entity, wherein a 3D representation of a first virtual graphic object is displayed on the virtual entity; and a first plurality of virtual display objects, wherein each of the virtual display objects include a 3D mesh, and a two-dimensional (2D) representation of a virtual graphic object, wherein the virtual graphic object is associated with a virtual object in the game application, wherein the virtual entity is arranged along a first track, wherein the first plurality of virtual display objects is arranged along a second track, wherein the first track intersects the second track at a virtual entity node, and wherein the first virtual object is located at the virtual entity node; moving the first plurality of virtual display objects along the second track in response to input such that a first virtual display object intersects with the virtual entity node; identifying a second virtual graphic object associated with the first virtual display object; identifying a 3D representation of the second virtual graphic object; updating the virtual entity to replace the 3D representation of the first virtual graphic object with the 3D representation of the second virtual graphic object; and updating a virtual display object of the first plurality of virtual display objects to display a 2D representation of the first virtual graphic object.

In some aspects, the techniques described herein relate to a computer-implemented method, wherein the first track is perpendicular to the second track.

In some aspects, the techniques described herein relate to a computer-implemented method, wherein the virtual entity includes one or more zones, and wherein the virtual graphic objects correspond to one of the one or more zones.

In some aspects, the techniques described herein relate to a computer-implemented method, wherein the first plurality of virtual display objects are associated with a first zone of the one or more zones and a second plurality of virtual display objects are associated with a second zone of the one or more zones.

In some aspects, the techniques described herein relate to a computer-implemented method, wherein each plurality of virtual display objects are arranged along its own track, and wherein each track intersects with the first track.

In some aspects, the techniques described herein relate to a computer-implemented method, wherein a virtual graphic object is associated with the first zone and the second zone.

In some aspects, the techniques described herein relate to a computer-implemented method, wherein the 2D representation of the virtual graphic object is a projection of the 3D representation of the virtual object from a particular viewpoint.

In some aspects, the techniques described herein relate to a computing system including one or more processors and a non-transitory computer storage medium storing instructions that when executed by the one or more processors, cause the one or more processors to perform operations including: causing a customization interface to display within a virtual environment of a game application, the customization interface including: a three-dimensional (3D) virtual entity, wherein a 3D representation of a first virtual graphic object is displayed on the virtual entity; and a first plurality of virtual display objects, wherein each of the virtual display objects include a 3D mesh, and a two-dimensional (2D) representation of a virtual graphic object, wherein the virtual graphic object is associated with a virtual object in the game application, wherein the virtual entity is arranged along a first track, wherein the first plurality of virtual display objects is arranged along a second track, wherein the first track intersects the second track at a virtual entity node, and wherein the first virtual object is located at the virtual entity node; moving the first plurality of virtual display objects along the second track in response to input such that a first virtual display object intersects with the virtual entity node; identifying a second virtual graphic object associated with the first virtual display object; identifying a 3D representation of the second virtual graphic object; updating the virtual entity to replace the 3D representation of the first virtual graphic object with the 3D representation of the second virtual graphic object; and updating a virtual display object of the first plurality of virtual display objects to display a 2D representation of the first virtual graphic object.

In some aspects, the techniques described herein relate to a computing system, wherein the first track is perpendicular to the second track.

In some aspects, the techniques described herein relate to a computing system, wherein the virtual entity includes one or more zones, and wherein the virtual graphic objects correspond to one of the one or more zones.

In some aspects, the techniques described herein relate to a computing system, wherein the first plurality of virtual display objects are associated with a first zone of the one or more zones and a second plurality of virtual display objects are associated with a second zone of the one or more zones.

In some aspects, the techniques described herein relate to a computing system, wherein each plurality of virtual display objects are arranged along its own track, and wherein each track intersects with the first track.

In some aspects, the techniques described herein relate to a computing system, wherein a virtual graphic object is associated with the first zone and the second zone.

In some aspects, the techniques described herein relate to a computing system, wherein the 2D representation of the virtual graphic object is a projection of the 3D representation of the virtual object from a particular viewpoint.

In some aspects, the techniques described herein relate to a non-transitory computer readable medium including computer-executable instructions that, when executed by a one or more processors, cause the one or more processors to perform operations including: causing a customization interface to display within a virtual environment of a game application, the customization interface including: a three-dimensional (3D) virtual entity, wherein a 3D representation of a first virtual graphic object is displayed on the virtual entity; and a first plurality of virtual display objects, wherein each of the virtual display objects include a 3D mesh, and a two-dimensional (2D) representation of a virtual graphic object, wherein the virtual graphic object is associated with a virtual object in the game application, wherein the virtual entity is arranged along a first track, wherein the first plurality of virtual display objects is arranged along a second track, wherein the first track intersects the second track at a virtual entity node, and wherein the first virtual object is located at the virtual entity node; moving the first plurality of virtual display objects along the second track in response to input such that a first virtual display object intersects with the virtual entity node; identifying a second virtual graphic object associated with the first virtual display object; identifying a 3D representation of the second virtual graphic object; updating the virtual entity to replace the 3D representation of the first virtual graphic object with the 3D representation of the second virtual graphic object; and updating a virtual display object of the first plurality of virtual display objects to display a 2D representation of the first virtual graphic object.

In some aspects, the techniques described herein relate to a non-transitory computer readable medium, wherein the first track is perpendicular to the second track.

In some aspects, the techniques described herein relate to a non-transitory computer readable medium, wherein the virtual entity includes one or more zones, and wherein the virtual graphic objects correspond to one of the one or more zones.

In some aspects, the techniques described herein relate to a non-transitory computer readable medium, wherein the first plurality of virtual display objects are associated with a first zone of the one or more zones and a second plurality of virtual display objects are associated with a second zone of the one or more zones.

In some aspects, the techniques described herein relate to a non-transitory computer readable medium, wherein each plurality of virtual display objects are arranged along its own track, and wherein each track intersects with the first track.

In some aspects, the techniques described herein relate to a non-transitory computer readable medium, wherein a virtual graphic object is associated with the first zone and the second zone.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

FIG. 5 illustrates an embodiment of an animation of a virtual entity.

DETAILED DESCRIPTION OF EMBODIMENTS

Overview

Figure 1:
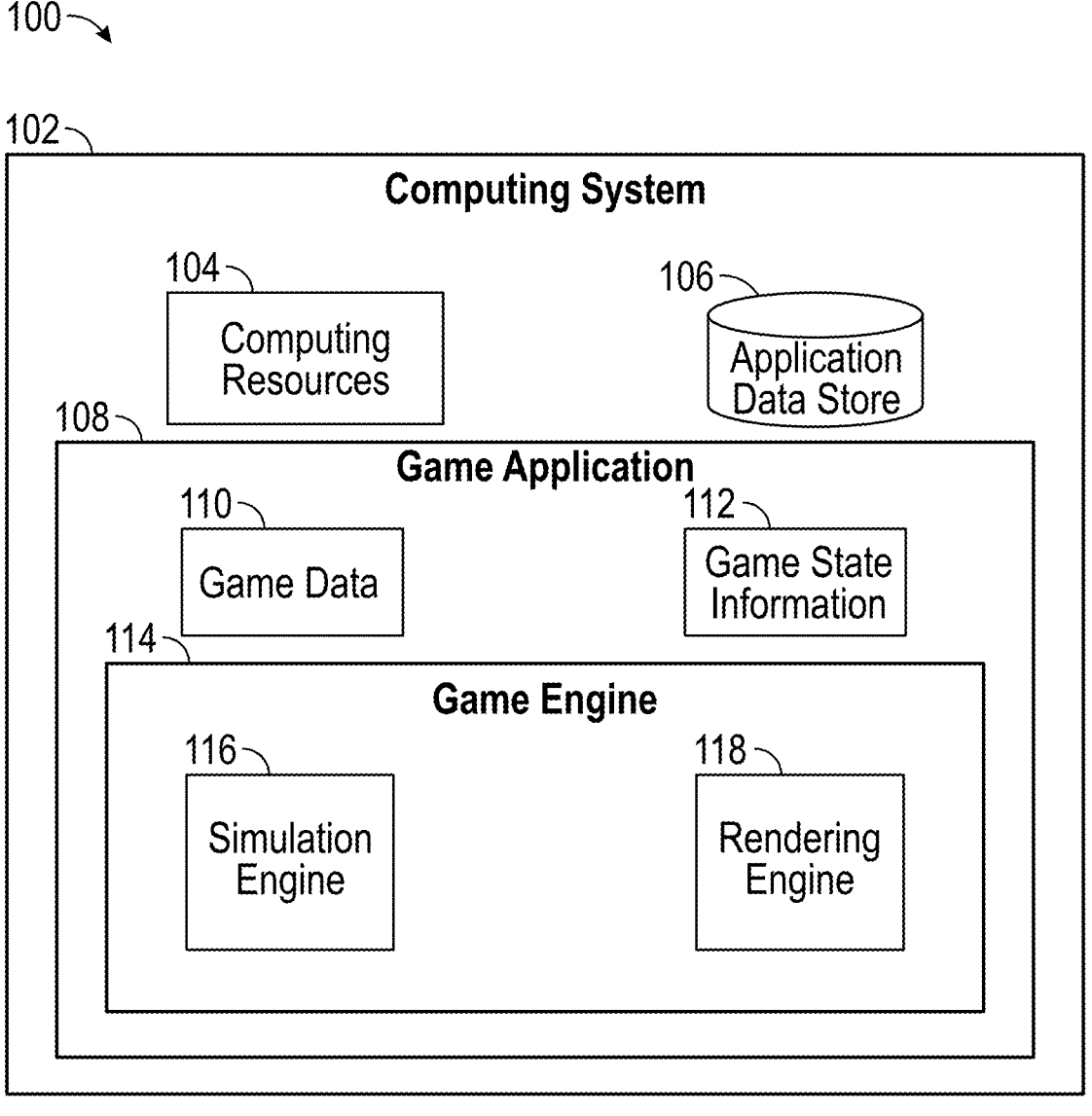
FIG. 1 illustrates an embodiment of a computing system that can implement one or more embodiments of a virtual object customization system.

Modern electronic games have advanced dramatically in terms of image quality and game mechanics compared to electronic games of the past. As electronic games advance, many players desire an electronic game that enables greater player input and customization to create a more immersive experience. To provide players the ability to customize game objects, including, but not limited to, the player character, games may include user interfaces that display a virtual entity and virtual display object. Existing user interfaces for customizing virtual entities can be inefficient, disjointed, and distracting to a user.

To address these issues, a system can be configured to generate a customization user interface to manage and display virtual entities and virtual graphic objects. The customization interface can use tracks to manage a virtual entity and other tracks to manage virtual graphic objects for the virtual entity. The user interface can display the virtual entity along a track and virtual graphic objects associated with the virtual entity along other tracks. The virtual entity track may intersect customization tracks associated with customization options for the virtual entity. For example, the user interface can have the virtual entity track intersect a customization track at a regions of the virtual entity, such a head, body, and legs. Each customization tracks includes virtual graphic objects associated with the corresponding region. The tracks and avatar can be arranged such that the avatar is displayed in line with the virtual entity track and the customization tracks intersect the virtual entity track at the same point that their respective region of the avatar intersects the virtual entity track.

Further, the system can enable players to interact with the user interface and cause the virtual display objects to move along nodes on a customization track to allow players to cycle through the options in a performant way. For example, the user interface may cause the virtual display objects to all shift one node position in a specific direction along their customization track. This can align the virtual display objects with the virtual entity. The user interface may then display the virtual graphic object that intersects with the virtual entity track on the virtual entity. The customization interface can update the virtual entity to apply or equip the selected customization options. For example, a user may scroll through various equipment options for the head, body, and legs of an avatar.

The system can be further configured to trigger an animation of the virtual entity in response to player interaction with the user interface. For example, the player may select the virtual graphic objects displayed on the virtual entity, and the system may trigger an animation of the virtual entity in reaction to that selection. For example, the virtual entity may be an avatar having feet, and the virtual graphic object selected may be a foot option, such as a pair of shoes. The system may then animate the avatar such that the avatar appears to look down at their feet and the newly selected pair of shoes.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to any systems and/or devices that could benefit from a multi-track virtual entity customization system.

Overview of Video Game Environment

FIG. 1 illustrates an embodiment of a computing system 100 for executing a game application 108 on a user computing system 102. The user computing system 102 includes computing resources 104, and application data store 106, and a game application 108. The user computing system 102 may have varied local computing resources 104 such as central processing units and architectures, memory, mass storage, graphics processing units, communication networks availability and bandwidth, and so forth. Further the user computing system 102 may include any type of computing system. For example, the user computing system 102 may be any type of computing device, such as a desktop, laptop, video game platform/console, television set-top box, television (for example, Internet TVs), network-enabled kiosk, car-console, device, computerized appliance, wearable device (for example, smart watches and glasses with computing functionality), and wireless mobile devices (for example, smart phones, personal digital assistants, tablets, or the like), to name a few. A more detailed description of user computing system 102 is described below with respect to FIG. 8.

Game Application

In one embodiment, the user computing system 102 can execute a game application 108 based on software code stored at least in part in the application data store 106. The game application 108 may also be referred to as a video game, a game, game code, and/or a game program. A game application 108 should be understood to include software code that a user computing system 102 can use to provide a game for a user to play. A game application 108 may comprise software code that informs a user computing system 102 of processor instructions to execute but may also include data used in the playing of the game, such as data relating to constants, images, and other data structures. For example, in the illustrated embodiment, the game application 108 includes game data 110, game state information 112, and a game engine 114, which includes a simulation engine 116, and a rendering engine 118.

In some embodiments, the user computing system 102 is capable of executing a game application 108, which may be stored and/or executed in a distributed environment. For example, the user computing system 102 may execute a portion of a game, and a network-based computing system (not shown) may execute another portion of the game. For instance, the game may be an online adventure game that includes a client portion executed by the user computing system 102 and a server portion executed by one or more application host systems.

Game Engine

In one embodiment, the game engine 114 is configured to execute aspects of the operation of the game application 108 within the computing device 100. Execution of aspects of gameplay within a game application can be performed by the simulation engine 116, and the rendering engine 118. The runtime execution of the game application can be based, at least in part, on the user input received, the game data 110, and/or the game state information 112. The game data 110 can include game rules, prerecorded motion capture poses/paths, environmental settings, skeleton models, and/or other game application information.

Simulation Engine

The simulation engine 116 can read in-game rules and generate game state based on input received from one or more users. The simulation engine 116 can control execution of individual objects, such as virtual components, virtual effects, and or/virtual characters, within the game application. The simulation engine 116 can manage and determine object movement, object states, collision detection, derive desired motions for characters and virtual objects (such as, swords) based on gameplay information, such as user inputs, and determine virtual entity events such as actions, collisions, runs, movement direction, velocity, attacks, and other events appropriate for the game. The virtual entity events can be controlled by movement rules that determine the appropriate motions the virtual entities should make in response to events.

The simulation engine 116 can include a physics engine that can determine new poses for the virtual entities. The physics engine can have as its inputs, the skeleton models of various virtual entities, environmental settings, states such as current poses (for example, positions of body parts expressed as positions, joint angles, or other specifications), and velocities (linear and/or angular) of virtual objects and motions provided by a movement module, which can be in the form of a set of force/torque vectors for some or all components of the virtual entities. From this information, the physics engine generates movement, such as new poses for characters or a new position, using rules of physics and those new poses can be used to update virtual entity states. The simulation engine 116 provides for user input to control aspects of the game application according to defined game rules. Examples of game rules include rules for possible inputs, actions/events, movement in response to inputs, and the like. Other components can control what inputs are accepted, how the game progresses, and other aspects of gameplay.

In one example, after the simulation engine 116 determines the in-game events, the in-game events can be conveyed to a movement engine that can determine the appropriate motions the virtual entity should make in response to the events and passes those motions on to a physics engine. The physics engine can determine new poses/positions for the virtual entities and provide the new poses/positions to a rendering engine.

Rendering Engine

The rendering engine 118 can generate and render frames for output to a display within the game application. The rendering engine 118 can use simulation data, function data, and other data to generate and render frames. The rendering engine 118 can be responsible for taking three-dimensional scene data, including the geometry of the objects, the lighting, and the camera view, and using it to generate a two-dimensional image that represents the scene from the specified viewpoint. The rendering engine 118 can combine the virtual entities, such as virtual characters, animate objects, inanimate objects, background objects, lighting, reflection, and the like, in order to generate a full scene and a new frame for display.

The rendering engine 118 can take into account the surfaces, colors, textures, and other parameters during the rendering process. The rendering engine 118 can combine the virtual objects (e.g., lighting within the virtual environment and virtual character images with inanimate and background objects) to generate and render a frame for display to the user. The process can be repeated for rendering each frame during execution of the game application.

During the rendering process a surface shader can be used. A surface shader is a type of shader that can determine how light interacts with the surface of an object in a three-dimensional scene. When light hits an object, it can interact with the surface of the object and can either be absorbed, reflected, or refracted. A surface shader can be responsible for calculating the amount and type of light that is reflected off the surface of the object. It can take into account the surface's color, texture, and other physical properties, such as roughness, glossiness, and transparency. Surface shaders can be used by the rendering engine to create realistic-looking objects by simulating the way light interacts with real-world materials. They can be used to create a variety of surface effects, including matte surfaces, shiny surfaces, metallic surfaces, and more.

In the rendering process, once the geometry of a three-dimensional object has been defined, and the object has been placed in the three-dimensional scene with appropriate lighting, the surface shader is responsible for determining how light interacts with the surface of the object. During the shading stage, the renderer uses the surface shader to calculate the color and other appearance attributes of each point on the object's surface, based on the lighting and other parameters specified in the scene. The surface shader takes into account factors such as the object's texture, reflectivity, and transparency, as well as the angle of the incoming light and the angle of the viewer's perspective. After the surface shader has calculated the surface appearance for each portion on the virtual object, the renderer combines this information with other scene data, such as lighting and shadow information, to produce the final rendered image.

Game Data

The game data 110 can include game rules, prerecorded motion capture poses/paths, environmental settings, environmental objects, constraints, skeleton models, and/or other game application information. At least a portion of the game data 110 can be stored in the application data store 106. In some embodiments, a portion of the game data 110 may be received and/or stored remotely, in such embodiments, game data may be received during runtime of the game application.

Game State Information

During runtime, the game application 108 can store game state information 112, which can include a game state, character states, environment states, scene object storage, and/or other information associated with a runtime state of the game application 108. For example, the game state information 112 can identify the state of the game application 108 at a specific point in time, such as a character position, character action, game level attributes, and other information contributing to a state of the game application. The game state information can include dynamic state information that continually changes, such as character movement positions, and static state information, such as the identification of a game level within the game.

Virtual Environment

As used herein, a virtual environment may include a simulated environment (for example, a virtual space) instanced on a client computing system 102 and/or a server that is accessible by a client (for example, client computing system 102) located remotely from the server, to format a view of the virtual environment for display to a user of the client. The simulated environment may have a topography, express real-time interaction by the user, or include one or more objects positioned within the topography that are capable of locomotion within the topography. In some implementations, the topography may be a two-dimensional topography. In other instances, the topography may be a three-dimensional topography. In some implementations, the topography may be a single node. The topography may include dimensions of the virtual environment, or surface features of a surface or objects that are "native" to the virtual environment. In some implementations, the topography may describe a surface (for example, a ground surface) that runs through at least a substantial portion of the virtual environment. In some implementations, the topography may describe a volume with one or more bodies positioned therein (for example, a simulation of gravity-deprived space with one or more celestial bodies positioned therein). A virtual environment may include a virtual world, but this is not necessarily the case. For example, a virtual environment may include a game space that does not include one or more of the aspects generally associated with a virtual world (for example, gravity, a landscape, etc.). By way of illustration, the well-known game Tetris may be formed as a two-dimensional topography in which bodies (for example, the falling tetrominoes) move in accordance with predetermined parameters (for example, falling at a predetermined speed, and shifting horizontally or rotating based on user interaction).

The game instance of the video game 108 may include a simulated virtual environment, for example, a virtual environment that is accessible by users via clients (for example, client computing system s 102) that present the views of the virtual environment to a user. The virtual environment may have a topography, express ongoing real-time interaction by one or more users or include one or more objects positioned within the topography that are capable of locomotion within the topography. In some instances, the topography may include a two-dimensional topography. In other instances, the topography may include a three-dimensional topography. The topography may include dimensions of the space or surface features of a surface or objects that are "native" to the space. In some instances, the topography may describe a surface (for example, a ground surface) that runs through at least a substantial portion of the space. In some instances, the topography may describe a volume with one or more bodies positioned therein (for example, a simulation of gravity-deprived space with one or more celestial bodies positioned therein). The instance executed by the computer components may be synchronous, asynchronous, or semi-synchronous.

It should be understood the above description of the manner in which state of the virtual environment associated with the video game is not intended to be limiting. The game application 108 may be configured to express the virtual environment in a more limited, or richer, manner. For example, views determined for the video game representing the game state of the instance of the video game may be selected from a limited set of graphics depicting an occurrence in a given place within the video game. The views may include additional content (for example, text, audio, prestored video content, or other content) that describes particulars of the current state of the place, beyond the relatively generic graphics. For example, a view may include a generic battle graphic with a textual description of the opponents to be confronted. Other expressions of individual places within the video game are contemplated.

The game engine 114 generates game state data 112 that may be used locally within the game application 108 and may be transmitted to the interactive computing system 130 over a network. The execution of the instance of the game application 108 may include determining a game state associated with the game application 108. The game state data 112 may facilitate presentation of views of the video game to the users on the client computing system s 102. The game state data 112 may include information defining the virtual environment in which the video game is played. The execution of the game engine is described in further detail herein.

The execution of the game instance may enable interaction by the users with the game application 108 or other users through the interactive computing system 130. The game application 108 may be configured to perform operations in the game instance in response to commands received over a network from client computing system s 102. In some embodiments, users may interact with elements in the video game or with each other through the video game.

Users may participate in the video game through client game applications 108 implemented on client computing system s 102 associated with the users. Within the game instance of the video game executed by the game engine 114, the users may participate by controlling one or more of an element in the virtual environment associated with the video game. The user-controlled elements may include avatars, user characters, virtual environment units (for example, troops), objects (for example, weapons, horses, vehicle and so on), simulated physical phenomena (for example, wind, rain, earthquakes, or other phenomena), or other user-controlled elements.

The user-controlled character avatars may represent the users in the virtual environment. The user characters may include heroes, knights, commanders, leaders, generals or any other virtual environment entities that may possess strength, skills, abilities, magic powers, knowledge, or any other individualized attributes. The virtual environment units controlled by the user may include troops or any other game entities that may be trained, recruited, captured, or otherwise acquired by the users in groups or en-mass. The objects controlled by the users may include weapons, vehicles, projectiles, magic items, wardrobes, boots, armor, knapsacks, medicine, healing potion, or any other virtual items that may be employed by the users for interaction within the video game.

The user-controlled element(s) may move through and interact with the virtual environment (for example, user-virtual environment units in the virtual environment, non-user characters in the virtual environment, other objects in the virtual environment). The user controlled elements controlled by or associated with a given user may be created or customized by the given user. The user may have an "inventory" of virtual goods or currency that the user can use (for example, by manipulation of a user character or other user controlled element, or other items) within the virtual environment.

Controls of virtual elements in the video game may be exercised through commands input by a given user through client computing system s 102. The given user may interact with other users through communications exchanged within the virtual environment. Such communications may include one or more of textual chat, instant messages, private messages, voice communications, or other communications. Communications may be received and entered by the users via their respective client computing system s 102. Communications may be routed to and from the appropriate users through server(s).

Execution or performance of the user action by the game engine 114 may produce changes to the game state, which may reflect progresses or results of the user actions. In some examples, state changes caused by the execution of the user actions may be recorded in the application data store 106 or data store 134 to facilitate persistency throughout the instance of the video game. In some examples, execution of the user actions may not produce persistent changes to the game state (for example, a user character jumping forward and backward successively may not produce any perceivable game state changes to other users).

A given user may input commands with specific parameters to undertake specific deeds, actions, functions, spheres of actions or any other types of interactions within the virtual environment. For example, the given user may input commands to construct, upgrade or demolish virtual buildings; harvest or gather virtual resources; heal virtual user-controlled elements, non-player entities or elements controlled by other users; train, march, transport, reinforce, reassign, recruit, or arrange troops; attack, manage, create, demolish or defend cities, realms, kingdoms, or any other virtual environment locations controlled by or associated with the users; craft or transport virtual items; interact with, compete against or along with non-player entities or virtual environment elements controlled by other users in combats; research technologies or skills; mine or prospect for virtual resources; complete missions, quests, or campaigns; exercise magic power or cast spells; or perform any other specific deeds, actions, functions, or sphere of actions within the virtual environment. In some examples, the given user may input commands to compete against elements in an environment within the virtual environment—for example, Player vs. Environment (PvE) activities. In some examples, the given user may input commands to compete against each other within the virtual environment—for example, Player vs. Player (PvP) activities.

The instance of the video game may include virtual entities automatically controlled in the instance of the video game. Such virtual entities may or may not be associated with any user. As such, the automatically controlled virtual entities may be generated or developed by artificial intelligence configured with the game application 108 or server(s) by a provider, administrator, moderator, or any other entities related to the video game. These automatically controlled entities may evolve within the video game free from user controls and may interact with the entities controlled by or associated with the users, other automatically controlled virtual environment entities, as well as the topography of the virtual environment. Certain manifested traits may be associated with the automatically controlled entities in accordance with the artificial intelligence configured with server (s). As used herein, such automatically controlled virtual environment entities in the instance of the video game are referred to as "non-player entities."

In an online game, the instance of the video game may be persistent. That is, the video game may continue on whether or not individual users are currently logged in or participating in the video game. A user that logs out of the video game and then logs back in some time later may find the virtual environment or the video game has been changed through the interactions of other users with the video game during the time the user was logged out. These changes may include changes to the simulated physical space, changes in the user's inventory, changes in other users' inventories, changes experienced by non-user characters, or other changes.

Customizable Game Entities and Virtual Graphic Objects

Figure 2:
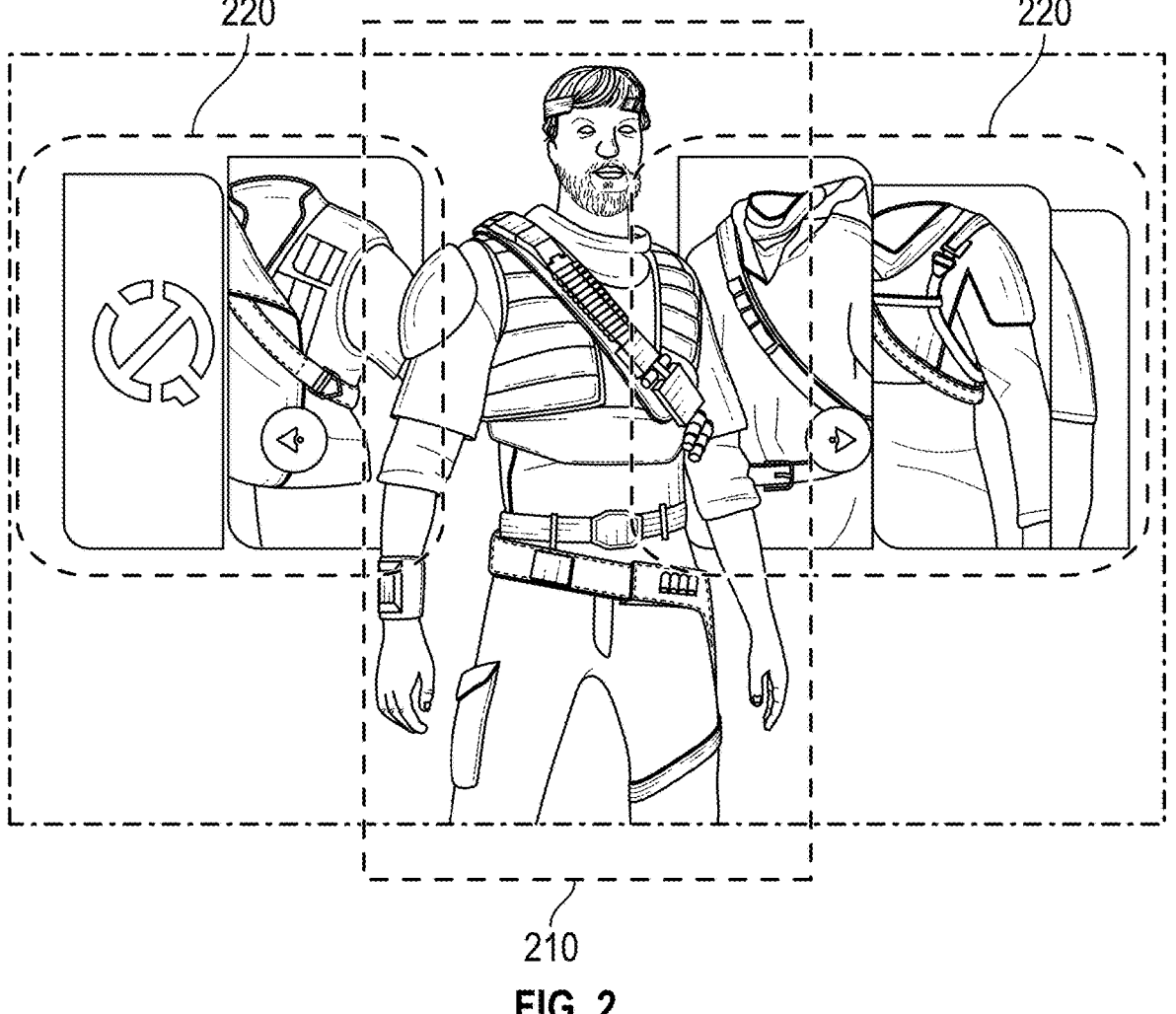
FIG. 2 is an image depicting an example of a virtual entity and virtual display objects.

FIG. 2 illustrates an example virtual environment depicting a virtual entity 210 and virtual graphic objects 220. A virtual entity can be a virtual object within a virtual environment, such as, for example, a character, avatar, weapon, vehicle, planet, or other virtual entity, having one or more customization zones corresponding to regions of the virtual entity. A virtual graphic object can be associated with a specific customization zone of the virtual entity. For example, in one embodiment a virtual entity may be a character having three customization zones, head, body, and legs. In another embodiment a virtual entity may be a rocket having three zones, nose cone, body, and engine. In another embodiment a virtual entity may be a weapon having only one zone, for customizing a single aspect. For example, the virtual graphic object's may be different types of hilts of a sword.

A customization track can include a plurality of virtual display objects configured display a plurality of virtual graphic objects on the customization track. A virtual display object can be a three-dimensional mesh of any shape, including, but not limited to, a polyhedron, sphere, cylinder, or an irregular three-dimensional shape, with a two-dimensional texture. Each virtual graphic object can have a two-dimensional representation and a three-dimensional representation. The two-dimensional representation can be a projection of the three-dimensional representation from a particular viewpoint. Each virtual display object on the customization track can be associated with a two-dimensional representation of a virtual graphic object. The two-dimensional representation of the virtual graphic object can be rendered as a texture of its corresponding virtual display object. The three-dimensional representation of the virtual graphic object can be applied and rendered when the virtual graphic object is aligned with the virtual entity on the customization track.

Customization tracks 320 can correspond to the zones of a virtual entity, such that the virtual graphic objects are depictions of customization options which can be displayed with the virtual entity. For example, in one embodiment, a virtual entity may be a character having three zones, head, body, and legs. A customization track can include a plurality of virtual display objects illustrating the virtual graphic objects for the virtual entity. For example, as illustrated in FIG. 2, the customization track includes a plurality of virtual display objects depicting virtual graphic objects for the body of the virtual entity. virtual graphic objects corresponding to the plurality of virtual display objects for the body zone may depict items relating to the body of a character, such as, for example, shirts, jackets, scarfs, or gloves. The virtual display objects are configured to move along the customization track. When a virtual display object moves to the virtual entity or the virtual entity node, the virtual graphic object associated with the virtual display object is applied to the virtual entity. In other words, the virtual entity is rendered with virtual graphic object.

A customization interface may be implemented in a virtual environment during runtime of the game application. The background of the customization interface can be a static or dynamic environment. In some instances, the customization interface may be implemented in a pause screen or during a loading screen. The customization interface may be integrated into the virtual environment, such as a clothing store within the game application.

Customization Tracks

Figure 3A:
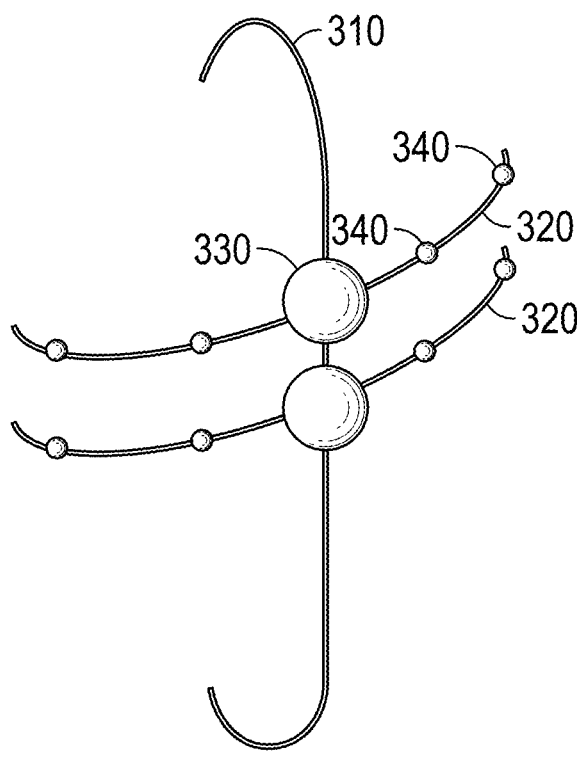
FIG. 3A is a diagram depicting an example of a wireframe of a combination track system used by a game engine to manage virtual entities and virtual display object.

FIG. 3A is a diagram depicting an example of a wireframe of a combination track system used by a game engine to manage virtual entities and virtual graphic objects. In one embodiment, the customization track system may include a first track, such as a spline, axis, or other line providing a motion path. The customization track can have a virtual entity customization track 310 and one or more customization tracks 320. The customization track can include a primary node 330 that is intersects with the virtual entity track 310 such that each customization track has a primary node 330 (also referred to as a virtual entity node) intersecting the virtual entity track 310. The customization track can have end points at which a virtual display object is visible within the customization interface. The virtual graphic objects may be within a queue defining a display order along the customization track. The customization track can be configured to display a defined number of virtual graphic objects at a time. The virtual graphic objects include the virtual graphic object displayed on the virtual entity and each virtual graphic object displayed on a virtual display object. The number of virtual graphic objects can be determined based on a number of virtual display objects that can be displayed along the customization track. In some embodiments, the customization tracks can include secondary nodes 340 that define locations on the customization track that the virtual display object stop. The secondary nodes 340 may be at uniform or nonuniform distances between each other. For example, the distance between secondary nodes 340 may increase as the nodes get closer to the primary node 330. The virtual display object's may move from one node to the next based on discrete user interactions. For example, the user may provide and input to move right or left and the virtual display objects automatically move in the indicated direction to the next secondary node 340, or to/from the primary node 330. In some embodiments, the customization tracks may not include secondary nodes. The virtual display objects can move along the customization track in response to the user interaction. For example, the virtual display objects can move continuously along the customization track based on the user interaction received.

Each customization tracks 320 can correspond to the zones of the virtual entity and intersect virtual entity track 310 at the primary node 330. For example, the virtual entity may be a character having two zones, body and legs. The virtual entity could be aligned with a virtual entity track and have two set intersection points on the virtual entity track, one for the body zone and one for the legs zone. There could be two customization tracks, one for the body zone and one for the legs zone. The body zone customization track could intersect the virtual entity track at the body zone intersection point, and the legs zone customization track could intersect the virtual entity track at the legs zone intersection point.

The number of customization tracks can correspond to the number of zones of the virtual entity, such that each zone can have one or more customization tracks associated with it. For example, in one embodiment the virtual entity may be a character having three zones, head, body, and legs. There may be two customization tracks associated with the head zone, one with the body zone, and one with the legs zone. One of the customization tracks associated with the head zone may manage virtual graphic object including headwear, another customization track associated with the head zone may manage virtual graphic objects including head and/or facial hair. The customization interface can move between the zones of the virtual entity. Certain customization tracks may only be visible in their corresponding zone.

Figure 3B:
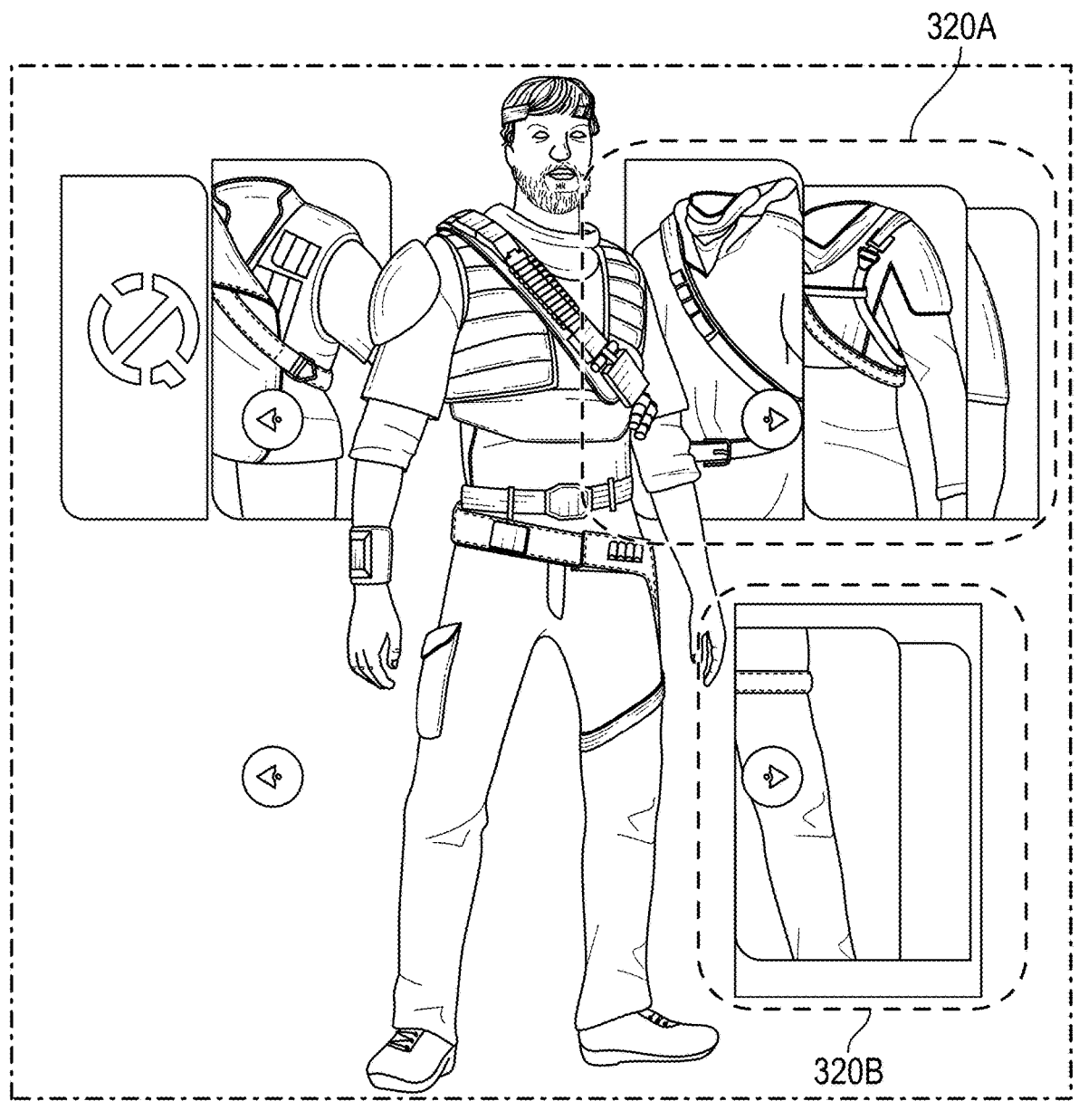
FIG. 3B is an image depicting a rendered screen of an example combination track system used by a game engine to manage virtual entities and virtual display objects.

FIG. 3B is an image depicting a rendered screen of an example combination track system used by a game engine to manage virtual entities and virtual graphic objects. FIG. 3B depicts an example of a virtual entity that is a character having multiple regions, including a body region and a legs region, aligned with a virtual entity track 310. The virtual graphic objects for the body region and legs region are displayed along corresponding customization tracks 320.

The virtual entity track 310 and customization tracks 320 may be oriented at any angle. For example, FIG. 3B depicts an example of a combination track system where the virtual entity track 310 is generally oriented vertically along the y-axis, and customization tracks 320 are generally oriented horizontally along the x-axis. In another embodiment, virtual entity track 310 and the customization tracks 320 may have different orientations. In another embodiment, virtual entity track 310 may be oriented at a first angle and may intersect one or more customization tracks at a second angle. In another embodiment, virtual entity track 310 may be oriented at a first angle, may intersect one or more customization tracks at a second angle, and may intersect one or more customization tracks at a third angle.

The rendering engine 118 may render one or more customization tracks at a time. For example, FIG. 3B depicts an image where two customization tracks are used concurrently. The game engine 114 can receive user input corresponding to a movement direction. The simulation engine 116 can receive input to update the position of virtual display objects on one or more customization track(s) and determine, based on the movement direction received, which customization track(s) should be manipulated. The rendering engine 118 may display the virtual graphic objects of customization track 320A and 320B. The game engine 114 can receive user input directing movement along the customization tracks. The virtual display objects can traverse virtual entity track 310 starting at a node 340 of customization track 320 and moving along the customization track 320 until the virtual display object intersects with another node 340 or the primary node 330. In some embodiments, the customization track 320 may only have a primary node and the virtual display objects may move freely along the customization track between endpoints and the primary node 330.

Operation of Customization Interface

Figure 4:
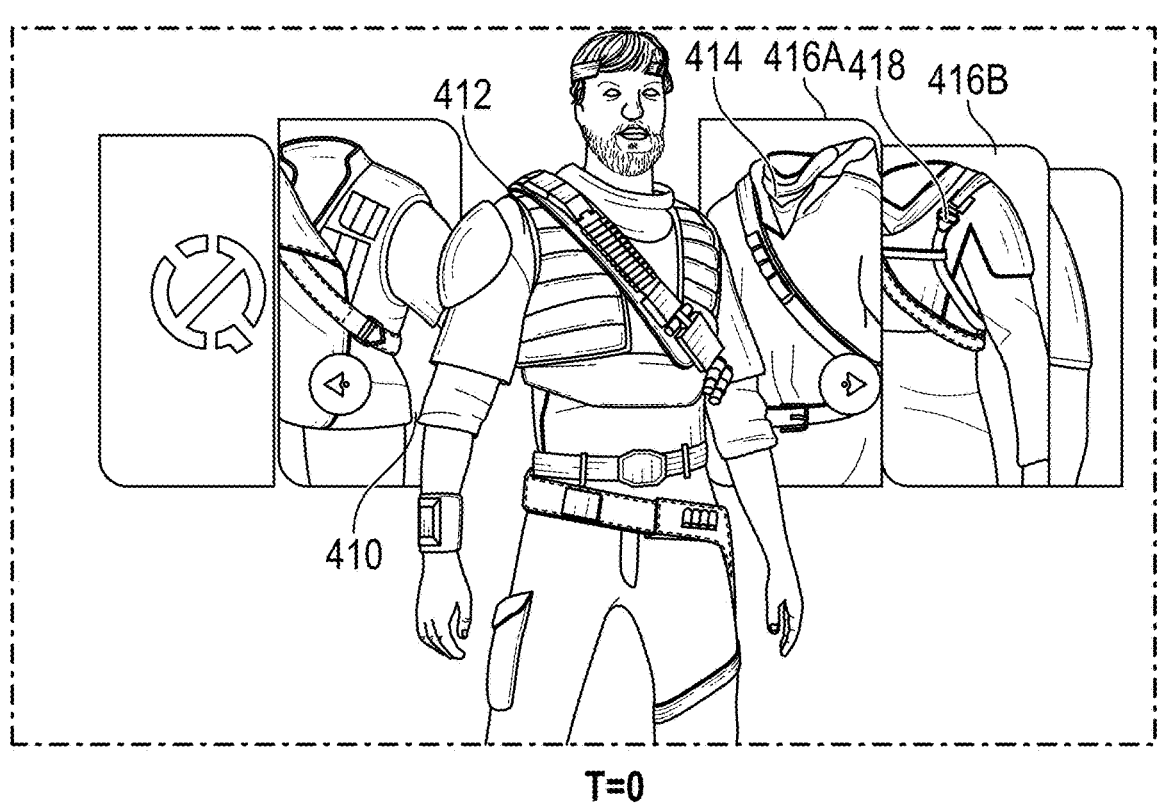
FIG. 4 illustrates an embodiment of a virtual object customization system.
Figure 4:
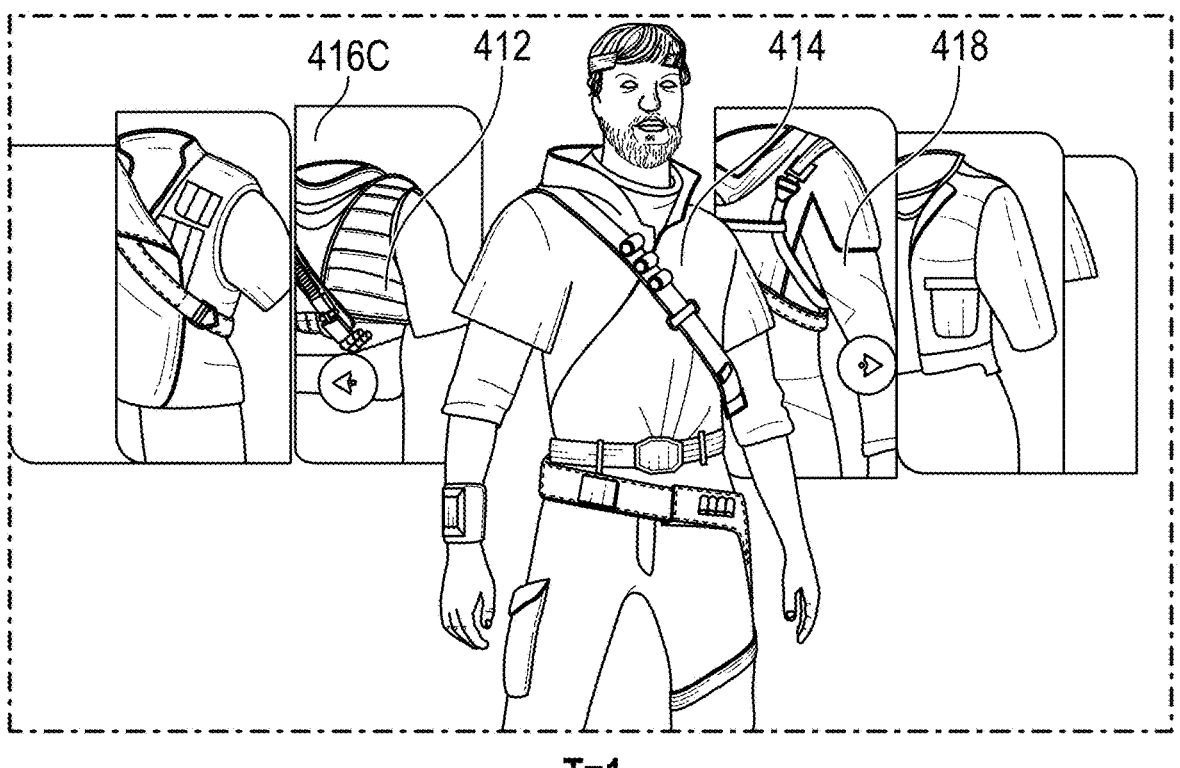

FIG. 4 illustrates an embodiment where virtual display objects move along a track and the virtual entity is rendered with the three-dimensional representation of the virtual graphic object corresponding to the virtual display object intersecting the virtual entity node at a particular time. Virtual display objects can move along a customization track. A virtual display object may move to the intersection point of its respective customization track and the virtual entity node. When a virtual display object is at the intersection point, the three-dimensional representation of the corresponding virtual graphic object can be applied to the virtual entity and rendered.

As illustrated, there is a first time, T=0, and a second time, T=1. There is a virtual entity 410. In the illustrated embodiment, virtual entity 410 is a character having at least one zone, a body zone. There is a customization track and a plurality of virtual display objects arranged along it. Accordingly, there is a plurality of virtual display objects, including virtual display objects 416A-416C, and a plurality of virtual graphic objects, including a virtual graphic object 412 and virtual graphic object 414. At T=0, virtual display object 416A is arranged along the customization track at a point to the right of and proximate to virtual entity 410, virtual display object 416B is arranged along the customization track at a point to the right of and proximate to virtual display object 416A, a two-dimensional representation of virtual graphic object 414 is rendered with virtual display object 416A, and a three-dimensional representation of virtual graphic object 412 is rendered with virtual entity 410. At T=1, virtual display object 416A is removed from the interface and is not rendered, a three-dimensional representation of virtual graphic object 414 is applied as a mesh and texture with virtual entity 410 and rendered, virtual display object 416B is arranged along the customization track at a point to the right of and proximate to virtual entity 410, virtual display object 416C is arranged along the customization track at a point to the left of and proximate to virtual entity 410, and a two-dimensional representation of virtual graphic object 412 is used as a texture for virtual display object 416C. At T=0, virtual display object 416B is located to the right of and proximate to virtual display object 416A, and a first portion of the two-dimensional representation of 418 is displayed on virtual display object 416B. At T=1, virtual display object 416B is located proximate to virtual entity 410, and a second portion of the two-dimensional representation of 418 is displayed on virtual display object 416B.

The virtual display objects can display items in such a way that the two-dimensional representation of a virtual graphic object can appear to be three-dimensional. The virtual display object can be a three-dimensional mesh that is moving along the customization track. The virtual display object moves along the customization track and through the 3D space of the virtual environment of the customization interface, which can provide different orientations of the virtual display object that are presented and rendered within the interface. This can create a parallax effect as the virtual display object moves. This can cause the virtual display objects to display items in such a way that it can appear to a user that the two-dimensional representation of a virtual graphic object is a three-dimensional virtual object contained within a virtual display object. This can be accomplished by applying a two-dimensional texture to a three-dimensional virtual object. The 2D virtual graphic object texture may be larger than the three-dimensional virtual display object, and the 2D texture can wrap around edges of the 3D mesh, which can create an illusion three dimensionality. The virtual display object can have additional textures and graphical effects layered with the 2D virtual graphic object texture to further enhance the three-dimensional appearance of the virtual graphic object. In some instances, the virtual display objects can slightly rotate, such as along a vertical axis, as they move to further enhance the 3D effect.

FIG. 5 illustrates an example of an animation of a virtual entity. In some embodiments, in response to a virtual entity equipping a virtual graphic object, an animation of the virtual entity with the newly equipped virtual graphic object may be triggered. As illustrated, there is a first time, T=0, a second time, T=1, and a third time, T=2, and a VE. At T=0, the virtual entity is rendered in a default pose. At T=1, the virtual entity is rendered in a first pose different from the default pose. At T=2, the virtual entity is rendered in a second pose different from the default pose and the first post. The animation may be any length of time and may be based on the specific virtual graphic object being equipped by the virtual entity.

In some embodiments, the animation and/or alternative poses for the virtual entity may be based on the virtual graphic object equipped and other virtual graphic objects equipped by the virtual entity. For example, if a specific virtual graphic object completes a set of virtual graphic objects, a specific animation may be triggered that is different from an animation associated with a single virtual graphic object in a specific zone of the virtual entity. In some embodiments animation may be triggered in response to user input confirming that the customization session for the virtual entity is complete. For example, a virtual entity may admire the outfit, or if virtual entity is a rocket, it may fire the engine and move off the interface. In some embodiments, animation may be triggered in response to a virtual display object intersecting the virtual entity node.

Figure 6A:
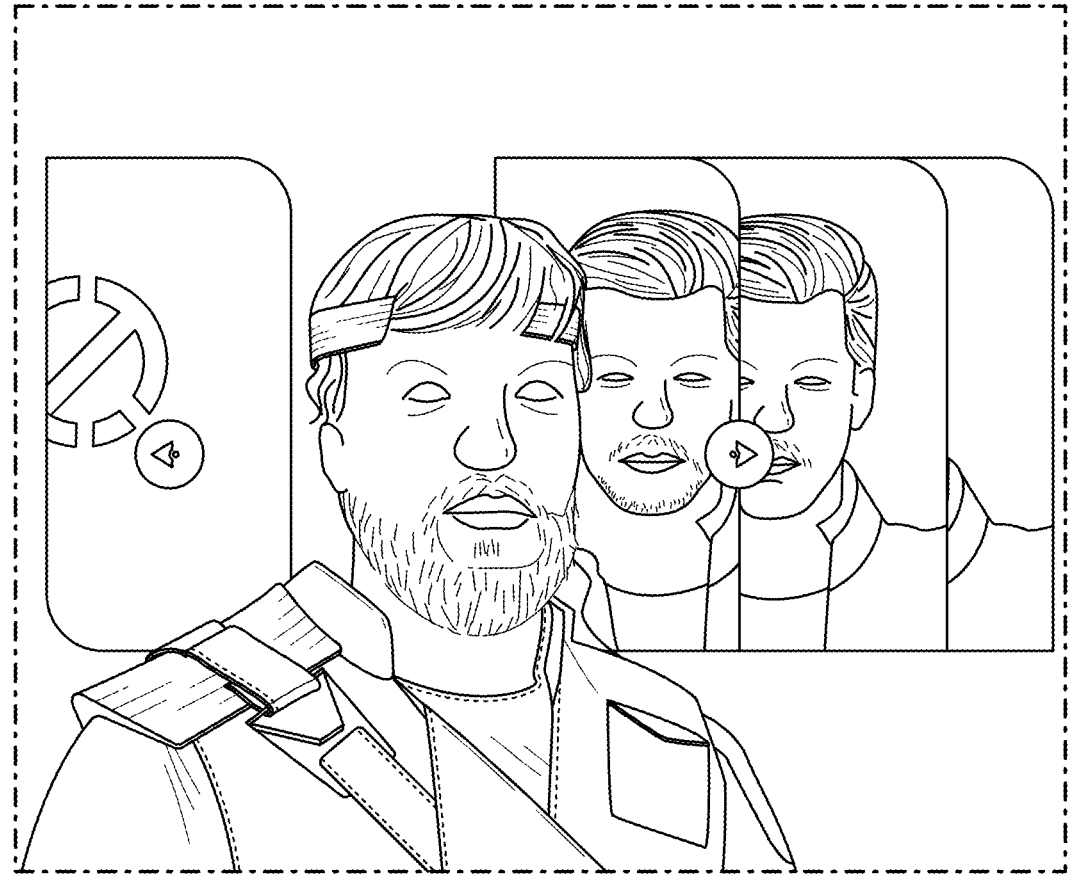
FIGS. 6A and 6B illustrate embodiment of frames rendered in a virtual object customization system at different zoom levels.
Figure 6B:
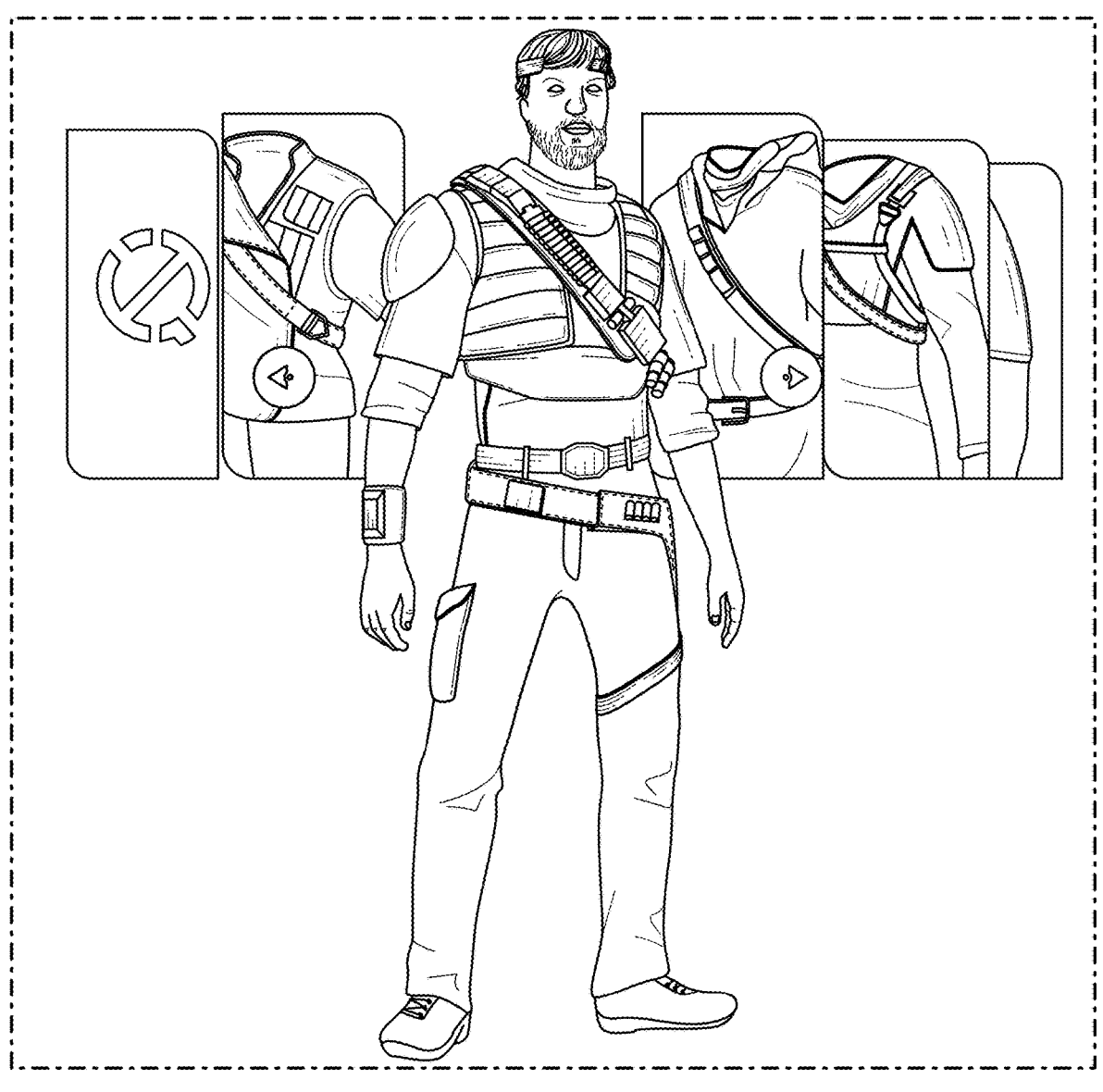

In some embodiments, the rendering engine can render a frame displaying all zones of a virtual entity. In some embodiments, the rendering engine can render a frame displaying some, but not all zones of a virtual entity, to create the effect of different zoom levels. The customization interface may have multiple zoom levels of the virtual entity. The customization interface may display all zones of the virtual entity, but may have some, such as a subset, of the available customization tracks able to be interfaced with. For example, FIGS. 6A and 6B illustrate the customization interface at different zoom levels. FIG. 6A illustrates a zoomed-in view of a virtual entity, where the virtual entity is a character having at least a head zone and a body zone. In the zoom level displayed in FIG. 6A the head zone is the focus of the display and the customization track for the head zone can be interfaced with by a user. FIG. 6B illustrates a zoomed-out view of the virtual entity of FIG. 6A, wherein the frame rendered displays all zones of the virtual entity, but only the customization track and virtual display objects for the body zone can be interacted with.

Object Customization Process

Figure 7:
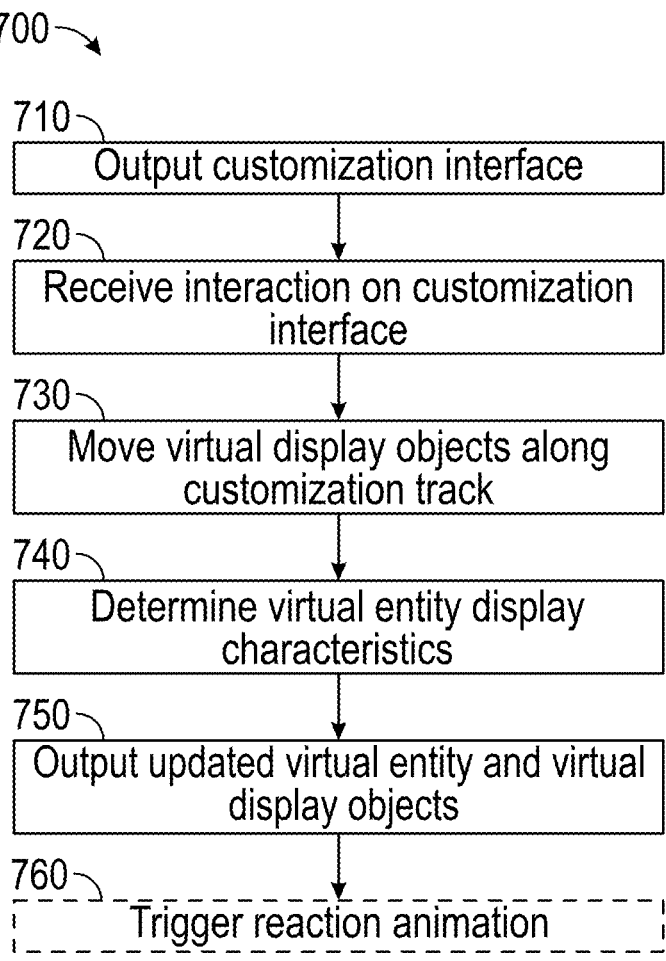
FIG. 7 illustrates a flow chart of an embodiment of a virtual object customization system.

FIG. 7 illustrates an embodiment of a flowchart for a process 700 for customization of a virtual entity within a virtual environment. The process 700 can be implemented by any system that can render images and register user input within a virtual environment during runtime. For example, the process 700, in whole or in part, can be implemented by a game application 108, a game engine 114, a simulation engine 116, a rendering engine 118, or other application modules. Although any number of systems, in whole or in part, can implement the process 700, to simplify discussion, the process 700 will be described with respect to the computing system 102.

At block 710, a customization interface is output during runtime of an application. The customization interface may be a user interface within a game application that is accessible at any time, or may be accessible at defined times during gameplay. In embodiments, the customization interface may be accessible through an application that is not running the game application. For example, an application may access virtual entities and virtual graphic objects associated with a user account and provide the customization interface outside of the operation of the corresponding game application. In such an instance, updates to the virtual entity from the application can be stored in association with the user account and accessible during a gameplay session of the game application. The customization interface can include a background, at least one virtual entity, and a plurality of virtual display objects associated with virtual graphic objects. The user interface can also include controls for user interaction. For example, the user interface may include one or more buttons indicating directions to move virtual display objects along a customization track. In some embodiments, the user interface may include one or more buttons which can allow users to indicate which zone of the virtual entity they wish to customize.

At block 720, the application can receive user interaction on the customization interface. In some embodiments, the game application can receive input identifying a direction in which to move virtual display objects along a customization track. For example, if a customization track is aligned along the x-axis, the application may receive input to move the virtual display object on the customization track in a specific direction.

At block 730, move virtual display objects along customization track in response to the received interaction. In some embodiments, virtual display objects may move along a customization track in response to input received at block 720. The virtual display objects may continue to move along the customization track until a virtual display object intersects a virtual entity node.

At block 740, the game application determines updated virtual entity display characteristics based on the virtual graphic object that intersected with the virtual entity node. The game application can determine which virtual graphic object corresponds to the intersecting virtual display object virtual display object and retrieve the corresponding three-dimensional representation of that virtual graphic object from game data 110. The game application can apply the appropriate three-dimensional representations (e.g., mesh and/or texture) to the virtual entity of the corresponding virtual graphic object. For example, when a virtual entity is rendered with a three-dimensional representation of a virtual graphic object, the corresponding virtual display object and two-dimensional representation of that virtual graphic object are removed from the interface.

At block 750, the game application outputs an updated virtual entity with the virtual graphic object and the updated virtual display objects. The virtual entity is output and rendered with the 3D representation newly applied virtual graphic object. The previously applied virtual graphic objects move, the 2D representation of the virtual graphic object previously applied to the virtual entity is applied as a texture on a virtual display object. In some embodiments, this frame can display the virtual entity rendered with a different three-dimensional representation of a virtual graphic object from the previous frame. In some embodiments, this frame can display Vos in different positions than in the previous frame.

At block 760, optionally, the game application may trigger one or more reaction animations. In some embodiments, the simulation engine may determine animation(s) and/or poses for the VE based on the update. In some embodiments, animation may be triggered in response to the type of virtual graphic object, a set of virtual graphic objects on multiple zones, or user input received. For example, an animation may be triggered in response to the virtual entity equipping a different virtual graphic object to the head portion and a different animation may be triggered based on a virtual graphic object be equipped to a body portion.

Figure 8:
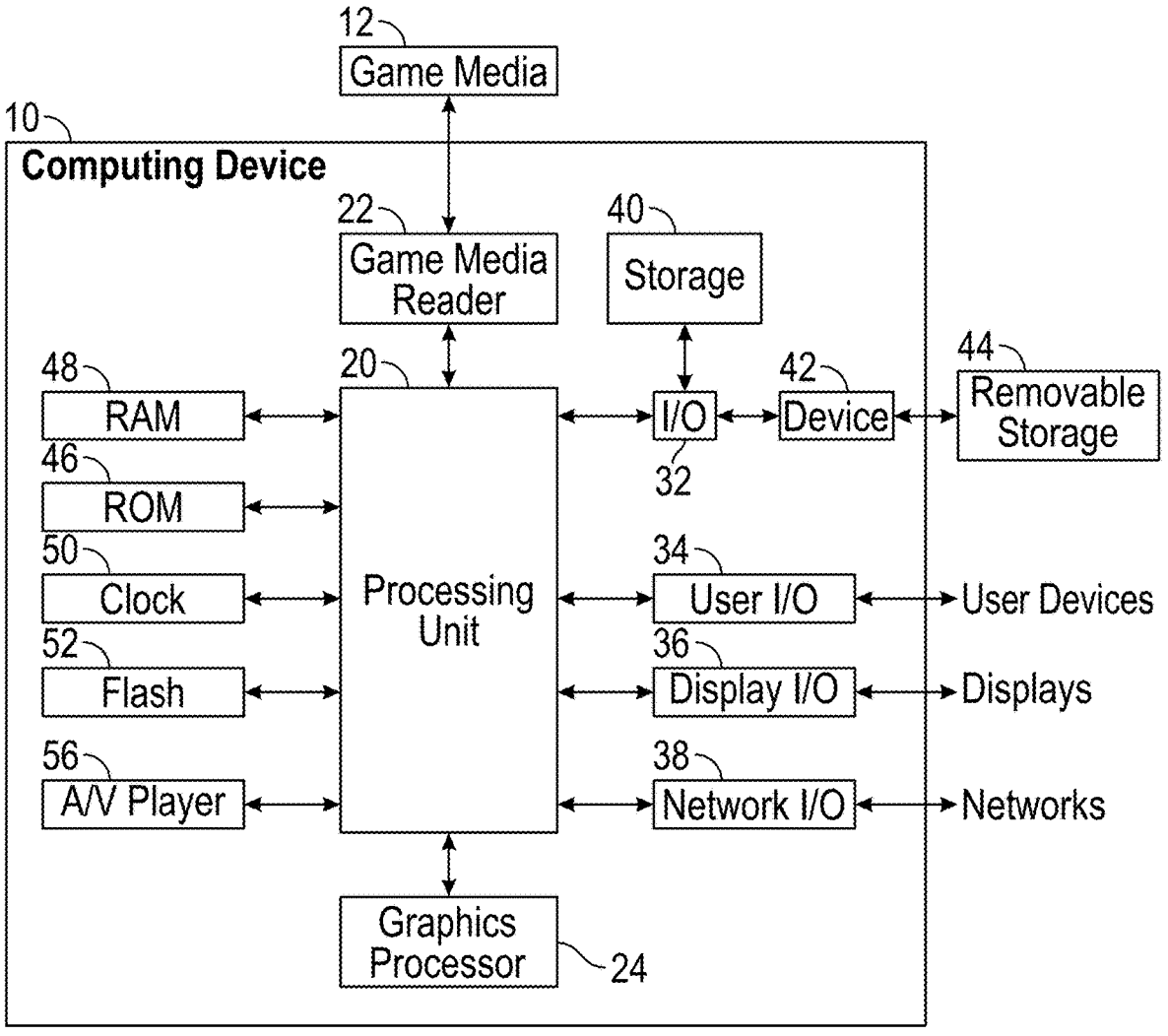
FIG. 8 illustrates an embodiment of a computing device.

FIG. 8 illustrates an embodiment of computing device 10 according to the present disclosure. Other variations of the computing device 10 may be substituted for the examples explicitly presented herein, such as removing or adding components to the computing device 10. The computing device 10 may include a game device, a smart phone, a tablet, a personal computer, a laptop, a smart television, a car console display, a server, and the like. As shown, the computing device 10 includes a processing unit 20 that interacts with other components of the computing device 10 and also external components to computing device 10. A media reader 22 is included that communicates with media 12. The media reader 22 may be an optical disc reader capable of reading optical discs, such as CD-ROM or DVDs, or any other type of reader that can receive and read data from game media 12. One or more of the computing devices may be used to implement one or more of the systems disclosed herein.

Computing device 10 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a handheld video game device, a dedicated game console computing system, a general-purpose laptop or desktop computer, a smart phone, a tablet, a car console, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data, such as game state data and any shared data files. In addition to storage 40 and removable storage media 44, computing device 10 is also shown including ROM (Read-Only Memory) 46 and RAM 48. RAM 48 may be used for data that is accessed frequently, such as when a game is being played or the fraud detection is performed.

User I/O 34 is used to send and receive commands between processing unit 20 and user devices, such as game controllers. In some embodiments, the user I/O can include a touchscreen inputs. The touchscreen can be capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online and/or application of fraud detection, and/or generation of a fraud detection model.

Display output signals produced by display I/O 36 comprising signals for displaying visual content produced by computing device 10 on a display device, such as graphics, user interfaces, video, and/or other visual content. Computing device 10 may comprise one or more integrated displays configured to receive display output signals produced by display I/O 36. According to some embodiments, display output signals produced by display I/O 36 may also be output to one or more display devices external to computing device 10, such a display 16.

The computing device 10 can also include other features that may be used with a game, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10.

Program code can be stored in ROM 46, RAM 48 or storage 40 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads media 12 and provides an application, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

What is claimed is:

1. A computer-implemented method, comprising:

causing a customization interface to display within a virtual environment of a game application, the customization interface comprising:

a three-dimensional (3D) virtual entity, wherein a 3D representation of a first virtual graphic object is displayed on the virtual entity, and a first plurality of virtual display objects, wherein each of the virtual display objects comprise a 3D mesh, and a two-dimensional (2D) representation of a virtual graphic object, wherein the virtual graphic object is associated with a virtual object in the game application, wherein the virtual entity is arranged along a first track, wherein the first plurality of virtual display objects is arranged along a second track, wherein the first track intersects the second track at a virtual entity node, and wherein the first virtual graphic object is located at the virtual entity node;

moving the first plurality of virtual display objects along the second track in response to input such that a first virtual display object intersects with the virtual entity node;

identifying a second virtual graphic object associated with the first virtual display object;

identifying a 3D representation of the second virtual graphic object;

updating the virtual entity to replace the 3D representation of the first virtual graphic object with the 3D representation of the second virtual graphic object; and updating a virtual display object of the first plurality of virtual display objects to display a 2D representation of the first virtual graphic object.

2. The computer-implemented method of claim 1, wherein the first track is perpendicular to the second track.

3. The computer-implemented method of claim 1, wherein the virtual entity comprises one or more zones, and wherein the virtual graphic objects correspond to one of the one or more zones.

4. The computer-implemented method of claim 3, wherein the first plurality of virtual display objects are associated with a first zone of the one or more zones and a second plurality of virtual display objects are associated with a second zone of the one or more zones.

5. The computer-implemented method of claim 4, wherein each plurality of virtual display objects are arranged along its own track, and wherein each track intersects with the first track.

6. The computer-implemented method of claim 5, wherein a virtual graphic object is associated with the first zone and the second zone.

7. The computer-implemented method of claim 1, wherein the 2D representation of the virtual graphic object is a projection of the 3D representation of the virtual graphic object from a particular viewpoint.

8. A computing system comprising one or more processors and a non-transitory computer storage medium storing instructions that when executed by the one or more processors, cause the one or more processors to perform operations comprising:

causing a customization interface to display within a virtual environment of a game application, the customization interface comprising:

a three-dimensional (3D) virtual entity, wherein a 3D representation of a first virtual graphic object is displayed on the virtual entity, and a first plurality of virtual display objects, wherein each of the virtual display objects comprise a 3D mesh, and a two-dimensional (2D) representation of a virtual graphic object, wherein the virtual graphic object is associated with a virtual object in the game application, wherein the virtual entity is arranged along a first track, wherein the first plurality of virtual display objects is arranged along a second track, wherein the first track intersects the second track at a virtual entity node, and wherein the first virtual graphic object is located at the virtual entity node;

moving the first plurality of virtual display objects along the second track in response to input such that a first virtual display object intersects with the virtual entity node;

identifying a second virtual graphic object associated with the first virtual display object;

identifying a 3D representation of the second virtual graphic object;

updating the virtual entity to replace the 3D representation of the first virtual graphic object with the 3D representation of the second virtual graphic object; and updating a virtual display object of the first plurality of virtual display objects to display a 2D representation of the first virtual graphic object.

9. The computing system of claim 8, wherein the first track is perpendicular to the second track.

10. The computing system of claim 8, wherein the virtual entity comprises one or more zones, and wherein the virtual graphic objects correspond to one of the one or more zones.

11. The computing system of claim 10, wherein the first plurality of virtual display objects are associated with a first zone of the one or more zones and a second plurality of virtual display objects are associated with a second zone of the one or more zones.

12. The computing system of claim 11, wherein each plurality of virtual display objects are arranged along its own track, and wherein each track intersects with the first track.

13. The computing system of claim 12, wherein a virtual graphic object is associated with the first zone and the second zone.

14. The computing system of claim 8, wherein the 2D representation of the virtual graphic object is a projection of the 3D representation of the virtual graphic object from a particular viewpoint.

15. A non-transitory computer readable medium comprising computer-executable instructions that, when executed by a one or more processors, cause the one or more processors to perform operations comprising:

causing a customization interface to display within a virtual environment of a game application, the customization interface comprising:

a three-dimensional (3D) virtual entity, wherein a 3D representation of a first virtual graphic object is displayed on the virtual entity, and a first plurality of virtual display objects, wherein each of the virtual display objects comprise a 3D mesh, and a two-dimensional (2D) representation of a virtual graphic object, wherein the virtual graphic object is associated with a virtual object in the game application, wherein the virtual entity is arranged along a first track, wherein the first plurality of virtual display objects is arranged along a second track, wherein the first track intersects the second track at a virtual entity node, and wherein the first virtual graphic object is located at the virtual entity node;

moving the first plurality of virtual display objects along the second track in response to input such that a first virtual display object intersects with the virtual entity node;

identifying a second virtual graphic object associated with the first virtual display object;

identifying a 3D representation of the second virtual graphic object;

updating the virtual entity to replace the 3D representation of the first virtual graphic object with the 3D representation of the second virtual graphic object; and updating a virtual display object of the first plurality of virtual display objects to display a 2D representation of the first virtual graphic object.

16. The non-transitory computer readable medium of claim 15, wherein the first track is perpendicular to the second track.

17. The non-transitory computer readable medium of claim 15, wherein the virtual entity comprises one or more zones, and wherein the virtual graphic objects correspond to one of the one or more zones.

18. The non-transitory computer readable medium of claim 17, wherein the first plurality of virtual display objects are associated with a first zone of the one or more zones and a second plurality of virtual display objects are associated with a second zone of the one or more zones.

19. The non-transitory computer readable medium of claim 18, wherein each plurality of virtual display objects are arranged along its own track, and wherein each track intersects with the first track.

20. The non-transitory computer readable medium of claim 18, wherein a virtual graphic object is associated with the first zone and the second zone.

* * * * *